(12) United States Patent
Chaumel et al.

(10) Patent No.: US 6,213,428 B1
(45) Date of Patent: Apr. 10, 2001

(54) AIRCRAFT FORE STRUCTURE

(75) Inventors: Pascal Chaumel, Pláisance du Touch; Francis Dazet, St. Alban, both of (FR)

(73) Assignee: Aerospatiale Societe Nationale Industrielle, Paris (FR)

(*) Notice: Subject to any disclaimer, the term of this patent is extended or adjusted under 35 U.S.C. 154(b) by 0 days.

(21) Appl. No.: 09/245,842

(22) Filed: Feb. 8, 1999

(30) Foreign Application Priority Data

Aug. 19, 1998 (FR) .................................................. 98 10550

(51) Int. Cl.[7] ........................................................ B64C 1/00
(52) U.S. Cl. .......................................... 244/119; 244/102 R
(58) Field of Search ............................ 244/102 R, 102 A, 244/119, 120

(56) References Cited

U.S. PATENT DOCUMENTS 2,685,420 * 8/1954 Burnelli et al. .............. 244/102 R X
3,335,981 * 8/1967 Pauli et al. ........................ 244/102 R
3,653,615 * 4/1972 Spence .......................... 244/102 R X
4,228,975 * 10/1980 Sealey .............................. 244/102 R

* cited by examiner

*Primary Examiner*—Robert P. Swiatek
(74) *Attorney, Agent, or Firm*—Burns, Doane, Swecker & Mathis, LLP

(57) ABSTRACT

An aircraft fore-structure for wide- and very-wide body freight aircraft that is characterized by the presence of a unpressurized landing gear compartment in the lower fore end section. The landing gear compartment is formed by a ceiling at the top, that is preferably domed, and by a partition towards the rear. A door that is provided in the partition provides access through the landing gear compartment to the pressurized compartment located behind said partition. An opening in the fore of the landing gear compartment also provides access to the radar chamber without requiring the radome to be dismantled. The original layout of the landing gear compartment enables fore landing gear to be installed that is larger than that in existing aircraft.

11 Claims, 3 Drawing Sheets

AIRCRAFT FORE STRUCTURE

FIELD OF THE INVENTION

The present invention relates to an aircraft fore-structure that is particularly suitable for wide- and very-wide body freight aircraft.

BACKGROUND ART

At present, and as shown very schematically in FIGS. 1 and 2, the fore-structure of a wide body freight aircraft comprises a pressurized compartment 1 that is extended forward by a radome 2 that contains a radar chamber 3. Inside pressurized compartment 1 a plane floor 4 supports the cockpit and the freight accommodation. One or more access doors 5 can be provided under the fuselage in the pressurized zone behind radar chamber 3 to enable ground staff to enter the section of pressurized compartment 1 located under floor 4, in order to carry out standard maintenance operations.

In pressurized zone 5, an unpressurized landing gear compartment 6 is provided in the fuselage to receive the fore landing gear 7 in the retracted position. The landing gear compartment 6 is separated from pressurized compartment 1 by a certain number of partitions. The partitions include two lateral partitions that are more or less vertical, a fore partition, a rear partition as well as a ceiling that is often sloped towards the bottom working from the fore to the rear when the wheels are in front of the anchoring fittings of the strut of the undercarriage in the retracted position.

Depending on the aircraft, it may be noted that designers generally aim to reduce the size of the landing gear compartment by using shapes that are more or less complex or elaborate in order to increase, among other aims, the available space in the pressurized zone. However, in all these designs the layout of the fore structure remains standard and the other problems still exist.

The standard layout of the fore structure of freight aircraft is described in FIGS. 11.4.3 and 11.4.4 (page 400) of Chun Yung Nui's "Airframe Structural Design", which is the standard authority in the field of aeronautical structural design.

The standard layout does, however, present a certain number of drawbacks.

For instance, access to radar chamber 3 is only possible from the outside by dismantling radome 2. This operation, that is indispensable for any maintenance, repair or test work on the radar antenna, always requires the use of screws and/or hinges to fasten radome 2 to the aircraft. In order to carry out this operation, the system for fastening the radome requires a permanent degree of play. Consequently, there are inevitable projections between the edges of radome 2 and the aircraft structure. The projections, which are significant, or at least cannot be discounted, are located in a crucial zone. This results in aerodynamic drag interference and may disturb the anemometric air vents located near the raydome.

Moreover, the access doors 5 that are used by the ground staff in order to enter the lower section of pressurized compartment 1, give onto the exterior of the aircraft. The projections that are inevitably present between the door and the aircraft structure also cause aerodynamic drag that reduces aircraft performance.

Another drawback of the standard layout of the fore structure of aircraft is due to the shape of landing gear compartment 6. The spaces between the surfaces of the aircraft and the lateral surfaces of the landing gear compartment are often limited and, consequently, almost unusable. However, these spaces are pressurized and require structural reinforcement parts in order to readjust to pressurization.

Finally, the standard design of landing gear compartment 6 limits the volume available, especially for the wheels and the tires of the fore landing gear 7, and may prevent larger wheels from being mounted in the event of the aircraft being upgraded. In a very wide-body aircraft, the maximum mass of which may exceed 500 tonnes at take off, the load to which the fore landing gear is subject requires wheels and tires of measurements that are no longer compatible with a standard design landing gear compartment.

DISCLOSURE OF THE INVENTION

The aim of the invention is an aircraft fore structure, the totally original design of which enables all the problems caused by the standard design of fore structures to be resolved.

The aircraft fore structure according to the invention enables the access door that gives onto the exterior to be eliminated and also enables the number of times the raydome is dismantled to be significantly reduced, thereby limiting the dismantling operations to maintenance work required on the actual radome itself or on its surrounding structure. This leads to a marked improvement in the aerodynamic qualities of the aircraft.

The fore structure according to the invention also enables the volume available in the landing gear compartment to be adapted without difficulty to the measurements of the wheels and the tires of the fore landing gear in the event of an increase in the mass of the aircraft at takeoff.

According to the invention, these various results are achieved by means of an aircraft fore structure that comprises a pressurized compartment and a unpressurized landing gear compartment that is suitable for housing the fore landing gear in a retracted position, characterized by the fact that the unpressurized landing gear compartment constitutes a lower fore end section of said fore structure.

In other words, the landing gear compartment extends under the cockpit up to the fore point of the aircraft. The landing gear compartment is thus only separated from the pressurized compartment by a ceiling and a rear partition.

In a preferred embodiment of the invention, the landing gear compartment comprises an extension towards the rear beyond the rear partition. The fore landing gear is then hinged in said extension towards the rear such that it extends towards the front in the landing gear compartment when it is in the retracted position.

The extension towards the rear of the landing gear compartment is formed by lateral partitions that can either be more or less vertical or preferably sloped such that they meet near the top of the compartment.

The ceiling of the landing gear compartment is preferably domed downwards. This characteristic enables the ceiling to bear the difference in pressure that exists between the two surfaces without it being necessary to increase the mass of the ceiling to an unrealistic degree.

In order to provide access to the pressurized section of the compartment located behind the landing gear compartment without affecting the aerodynamic behavior of the aircraft, at least one access door is advantageously provided in the rear partition of the landing gear compartment. The access door may be more or less oval-shaped, with its main axis vertical to provide the assembly with greater structural resistance.

Improved structural resistance is also achieved by equipping the ceiling and the rear partition with stiffeners.

In order to avoid the radome being removed too often, which would lead to the problems of projection that are known in the technology of movable radomes and consequently an increase in aerodynamic drag, at least one opening to the radar chamber is advantageously projected in a fore partition that separates said chamber from the landing gear compartment.

The fore landing gear wheel or wheels are then located near the fore partition when the gear is in the retracted position.

Finally, in order to improve the safety level for ground staff operating in the landing gear compartment, a hand rail and/or anti-shatter net is advantageously provided inside said landing gear compartment.

BRIEF DESCRIPTION OF THE DRAWINGS

A non-limitative example of a preferred embodiment of the invention will now be described with reference to the attached drawings where.

DETAILED DISCLOSURE OF A PREFERRED EMBODIMENT OF THE INVENTION

Figure 4:
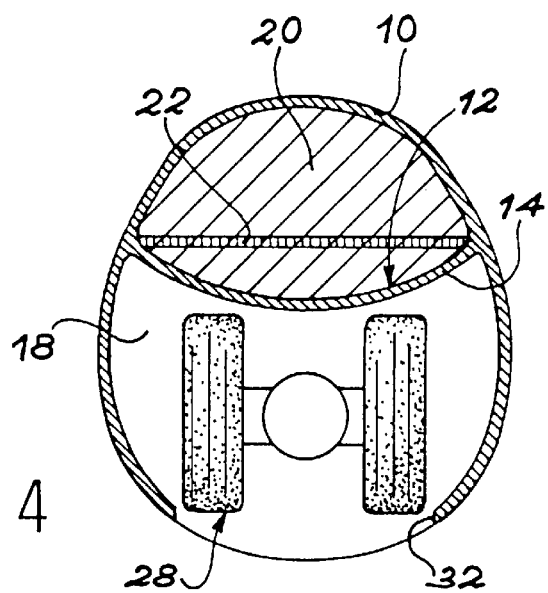
FIG. 4 is a cross section along line IV—IV in FIG. 3.
Figure 3:
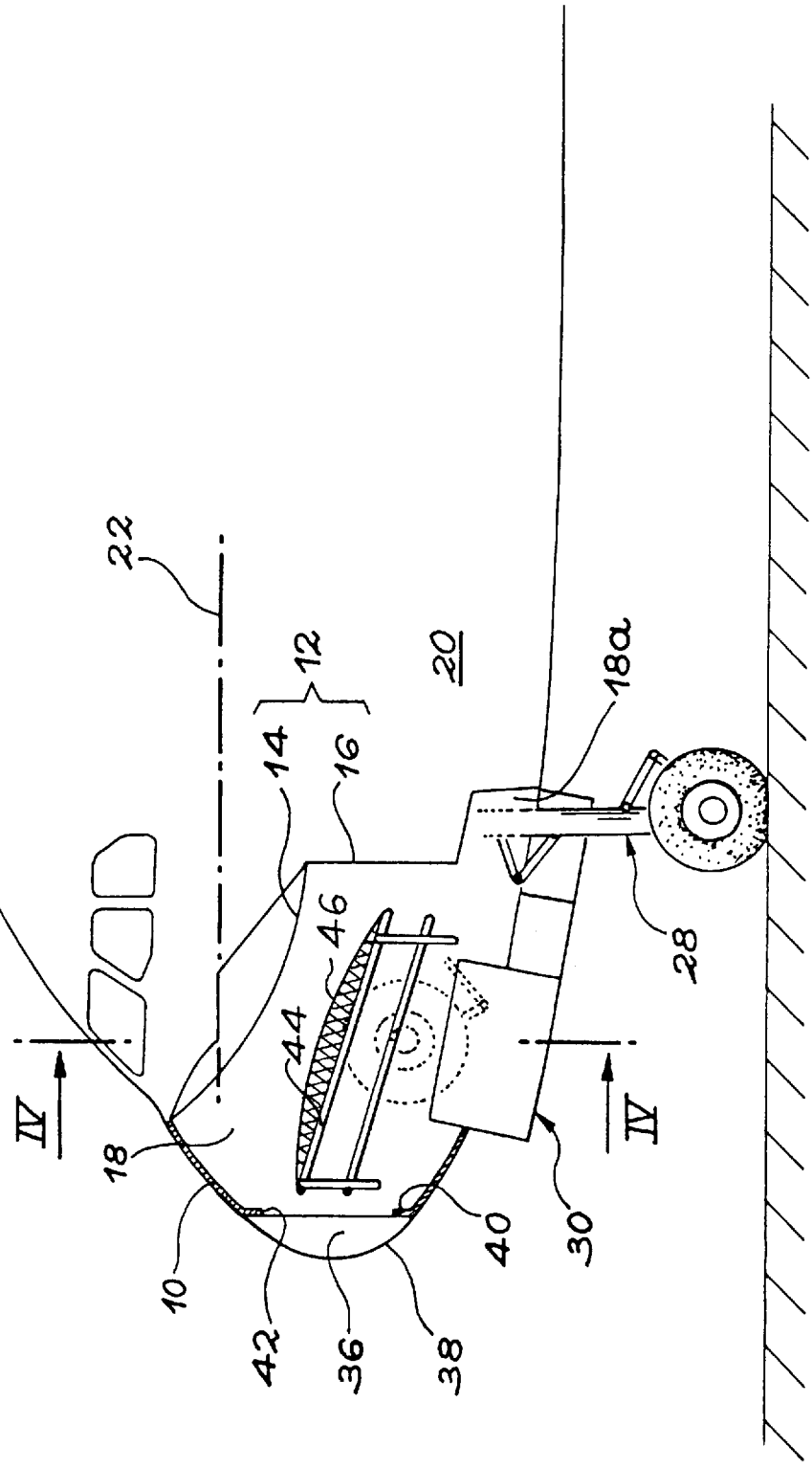
FIG. 3 is a side view of a partial cross section that shows schematically the fore section of an aircraft according to the invention.
Figure 5:
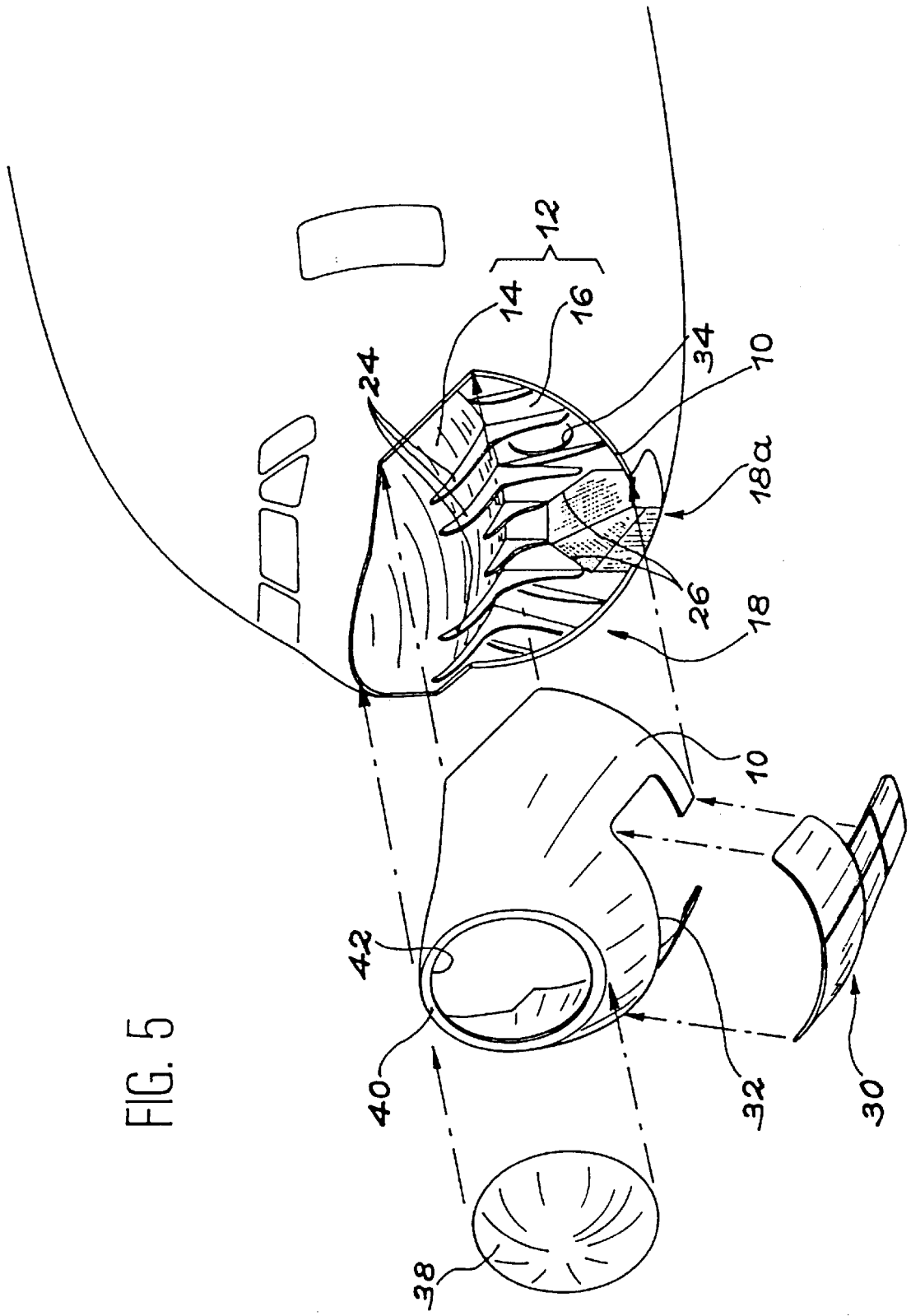
FIG. 5 is an exploded perspective view of the fore section of the aircraft illustrated in FIGS. 3 and 4.

FIGS. 3 to 5 show a preferred embodiment of a an aircraft fore structure according to the invention. A fore structure of this kind is advantageously suitable for wide- and very-wide body aircraft.

Reference 10 is the surface constituting the external envelope of the fore structure of the aircraft. The internal volume of the aircraft, formed by surface 10, is divided into two zones by an airtight separating partition 12.

More precisely, airtight separating partition 12 comprises a ceiling 14 and a rear partition 16 whose edges are connected to each other as well as to surface 10. The zone that is located under ceiling 14 and at the fore of rear partition 16 constitutes the lower end section of the aircraft fore structure. According to the invention, this zone constitutes the landing gear compartment 18 and is not pressurized.

The zone located above ceiling 14 and behind rear partition 16 constitutes the pressurized compartment 20 of the aircraft. This zone contains a plane floor 22 that is located above ceiling 14. The plane floor 22 supports the cockpit and the aircraft freight accommodation. The pressurized compartment 20 may be constructed in any way and still comply with the invention. Consequently, no description will be given here.

Preferably, as shown in FIGS. 3 to 5, ceiling 14 bulges downwards. This characteristic enables ceiling 14 to bear the difference in pressure that exists between the unpressurized landing gear compartment 18 and pressurized compartment 20 without it being necessary for said ceiling to be too thick.

For a similar reason the stiffeners 24, shown in FIG. 5, advantageously equip separating partition 12 for example on the side of the landing gear compartment 18. In the embodiment shown stiffeners 24 are angle bracket-shaped, the lower arm of which is more or less vertical and bears on rear partition 16, and the upper arm of which is more or less horizontal and bears on ceiling 14.

Landing gear compartment 18 comprises an extension 18a towards the rear that extends said compartment beyond rear partition 16 in the lower section of the fore structure. The extension 18a, that facilitates fastening of the compartment strut and distribution of the load, is mainly contained within two lateral partitions 26 (see FIG. 5).

In the embodiment shown in FIG. 5, lateral partitions 26 are sloped such that they join near the top of the compartment. This layout increases the space available in pressurized compartment 20 on either side of extension 18a between said extension and surface 10.

In a variation of the invention that is not shown, lateral partitions 26 can be more or less vertical. The large size of the aircraft and the reduced width of extension 18a provide easy access to the spaces between the extension and surface 10.

Figure 1:
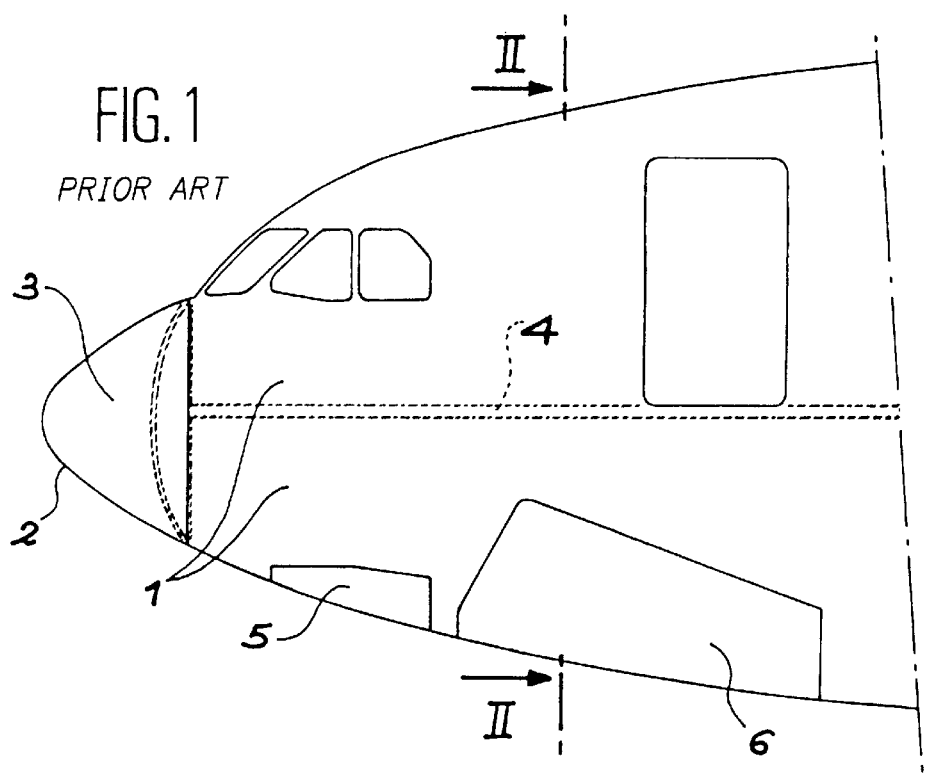
FIG. 1 (described above) is a side view that shows schematically the fore section of an aircraft of the prior art.
Figure 2:
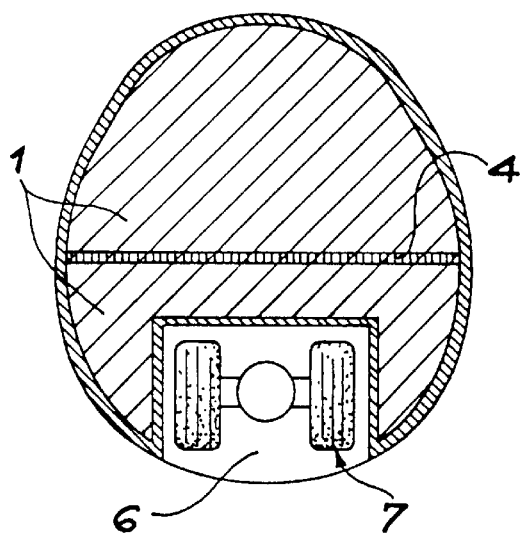
FIG. 2 (described above) is a cross section along line II—II in FIG. 1.

The landing gear compartment 18, which is extended towards the rear by extension 18a, enables large fore landing gear 28 (see FIGS. 2 and 3) to be housed in the fore structure of the aircraft. This original layout of the landing gear compartment enables fore landing gear 28 to be used, the sizes of the wheels and tires of which are adapted to the degree of load that is applied to the landing gear in the event of the aircraft being a very wide-bodied freight aircraft whose maximum mass may exceed 500 tonnes. A comparison of FIGS. 2 and 4 that both show a cross section of the aircraft at right angles to the wheels with the fore landing gear in the retracted position, clearly shows the extra space provided by the present invention (see FIG. 4) compared to the prior art (see FIG. 2).

More precisely, the fore landing gear 28 is hinged in extension 18a of landing gear compartment 18. It is brought into the retracted position by pivoting towards the fore such that the wheels and tires are completely housed inside landing gear compartment 18. Usually, a number of hatches 30 then close an opening 32 in the lower region of surface 10 that lies opposite landing gear compartment 18 and the extension towards rear 18a. The measurements of opening 32 are adapted to enable fore landing gear 28 to leave said landing gear compartment after hatches 30 have been opened when the aircraft lands.

As shown schematically in FIG. 5, at least one access door 34 is provided in rear partition 16. The access door 34 provides access through landing gear compartment 18 to pressurized compartment 20, under plane floor 22. Preferably, access door 34 is more or less oval-shaped, the major vertical axis of which is more or less vertical. This shape does not affect the structural resistance of rear partition 16. The access door 34 is located between two adjacent stiffeners 24.

The original layout of landing gear compartment 18 according to the invention and the presence of the access door 34 in rear partition 16 provides access to pressurized compartment 20 at the rear of partition 16 without any access door being required in external surface 10 of the aircraft. Consequently, the aerodynamic drag that would be caused by an access door of this kind in surface 10 is eliminated.

Usually, a radar chamber 36 constitutes the nose of the fore structure of the aircraft. The radar chamber is contained in the fore by a radome 38 that forms a continuation of surface 10 of the aircraft. Usually, radome 38 is fastened to external surface 10 by removable fastening means such as screws and/or hinges (not shown).

Unlike existing aircraft, radar chamber 36 is immediately adjacent to landing gear compartment 18 from which it is separated by a fore partition 40. At least one access opening 42 that is provided in fore partition 40 gives access to radar chamber 36 through landing gear compartment 18, particularly in order to carry out maintenance operations. This maintenance access may be used when it rains or other bad weather with the aircraft outside, whereas at present radar antenna maintenance requires the aircraft to be under shelter. This layout enables standard maintenance operations to be carried out without the radome 38 having to be removed. The aerodynamic streamlining of said radome with surface 10 of the aircraft may thus be better assured than on aircraft that use standard solutions.

It should be noted that the original landing gear compartment, located immediately behind radar chamber 36, enables the wheel or wheels of fore landing gear 28 to be positioned near partition 40 when the landing gear is in the retracted position.

In order to improve the level of safety when ground staff carry out operations inside the landing gear compartment 18, a hand rail 44 (see FIG. 3) runs the length of said landing gear compartment. More precisely, hand rail 44 comprises two lateral sections that lie towards the fore from rear partition 16 as well as a fore section that crosses the length of fore partition 40. Hand rail 44 enables ground staff to carry out operations in complete safety in radar chamber 36 and to have completely safe access via access door 34 to pressurized compartment 20 behind partition 16.

The hand rail 44 may also be used to hang a net 46 near ceiling 14. A net 46 of this kind is used to prevent any injury to the crew or damage to the cockpit resulting from pieces of the fore landing gear 28 being propelled towards ceiling 14 in the event of the tires bursting or other sections of the landing gear breaking when the aircraft lands or taxies on the ground.

A movable external staircase or a lifting truck can provide access to landing gear compartment 18. An onboard folding ladder (not shown) can also be kept for this purpose in landing gear compartment 18.

The invention is clearly not limited to the preferred embodiment described above. The shape of ceiling 14 and of landing gear compartment 18 may be different and still comply with the invention.

What is claimed is:

1. An aircraft fore structure comprising:
    a pressurized compartment; and
    an unpressurized landing gear compartment that is suitable to house fore landing gear in the retracted position, in which the unpressurized landing gear compartment constitutes a lower fore end section of the fore structure, and the unpressurized landing gear compartment is separated from the pressurized compartment by a ceiling and a rear partition, wherein the landing gear compartment comprises an extension towards the rear, beyond said rear partition, the fore landing gear being hinged in said extension towards the rear such that it extends towards the fore in the landing gear compartment in the retracted position.

2. The aircraft fore structure of claim 1 wherein said extension towards the rear comprises lateral partitions that are sloped to meet near the top of the landing gear compartment.

3. The aircraft fore structure of claim 1 wherein said extension towards the rear comprises lateral partitions that are more or less vertical.

4. The aircraft fore structure of claim 1 wherein the ceiling bulges downwards.

5. The aircraft fore structure of claim 1 wherein at least one access door is provided in the rear partition.

6. The aircraft fore structure of claim 5 wherein the at least one access door is more or less oval-shaped with a more or less vertical major vertical axis.

7. The aircraft fore structure of claim 1 wherein stiffeners reinforce the ceiling and the rear partition.

8. The aircraft fore structure of claim 1 wherein a hand rail is located in the landing gear compartment.

9. The aircraft fore structure of claim 8 wherein the hand rail bears a net for protecting the ceiling of the landing gear compartment.

10. An aircraft fore structure comprising:
    a pressurized compartment; and
    an unpressurized landing gear compartment that is suitable to house fore landing gear in the retracted position, in which the unpressurized landing gear compartment constitutes a lower fore end section of the fore structure, and wherein a radar chamber, contained within a radome, is provided at the fore of the landing gear compartment and wherein said radar chamber is separated from said landing gear compartment by a fore partition that is provided with at least one access opening.

11. The aircraft fore structure of claim 1 wherein the fore landing gear is provided with at least one wheel that is suitable for being located near the fore partition when said landing gear is in the retracted position.

* * * * *